(12) United States Patent
Nagami (10) Patent No.: US 8,418,319 B2
(45) Date of Patent: Apr. 16, 2013

(54) HINGE MECHANISM

(75) Inventor: Tetsuro Nagami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/265,546

(22) PCT Filed: Aug. 28, 2009

(86) PCT No.: PCT/JP2009/004226
§ 371 (c)(1),
(2), (4) Date: Oct. 21, 2011

(87) PCT Pub. No.: WO2011/024233
PCT Pub. Date: Mar. 3, 2011

(65) Prior Publication Data
US 2012/0036680 A1    Feb. 16, 2012

(51) Int. Cl.
*E05D 11/10* (2006.01)
(52) U.S. Cl.
USPC ........... 16/334; 16/297; 16/337; 16/374; 16/387
(58) Field of Classification Search ........ 16/334, 16/297, 374, 303, 330, 337, 340, 342, 387; 248/919, 922, 923; 361/679.27, 679.21, 361/679.22
See application file for complete search history.

(56) References Cited

U.S. PATENT DOCUMENTS

| 7,975,350 B2* | 7/2011 | Nagami | 16/367 |
| 2006/0021195 A1* | 2/2006 | Yamada et al. | 16/367 |
| 2011/0075335 A1* | 3/2011 | Nagami | 361/679.01 |
| 2011/0154616 A1* | 6/2011 | Nagami | 16/333 |
| 2011/0239405 A1* | 10/2011 | Nagami | 16/277 |

FOREIGN PATENT DOCUMENTS

| JP | 2000-55031 A | 2/2000 |
| JP | 2001-12451 A | 1/2001 |
| JP | 2002-250335 A | 9/2002 |
| JP | 2003-56547 A | 2/2003 |
| JP | 2003-336620 A | 11/2003 |

* cited by examiner

*Primary Examiner* — William L. Miller
(74) *Attorney, Agent, or Firm* — Birch, Stewart, Kolasch & Birch, LLP (57) ABSTRACT

A hinge mechanism 1 includes a rotation shaft 3 connected to a monitor and serving as rotating central axis X; a base 2 pivotally supporting the shaft 3 rotatably, and having click recesses 2b1, 2b2 and a housing position determining recess 2c on a circumference centering the axis X; a plate 5 attached at the end of the shaft 3; and a leaf spring 4 located between the base 2 and plate 5, fit-in by the rotation shaft 3, and having a click projection 4b that fits in the click recesses 2b1, 2b2 and recess 2c to hold the monitor in a predetermined rotation angle position. A sliding friction projection 4c sliding with pressed into contact with the base 2 is formed on the side opposite from the click projection 4b across the axis X, while a cutaway 2e entered by the projection 4c is formed in the base 2.

10 Claims, 7 Drawing Sheets

HINGE MECHANISM

TECHNICAL FIELD

The present invention relates to a hinge mechanism for folding and unfolding a monitor or the like.

BACKGROUND ART

Figure 6:
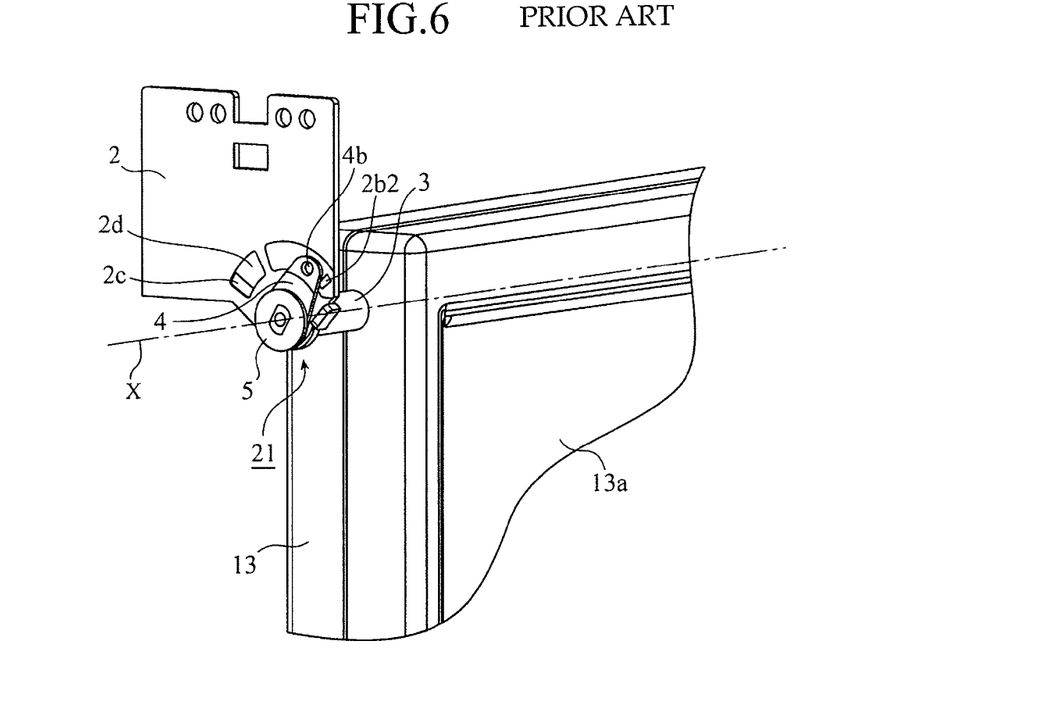
FIG. 6 is a perspective view showing an arrangement of a conventional hinge mechanism.
Figure 7:
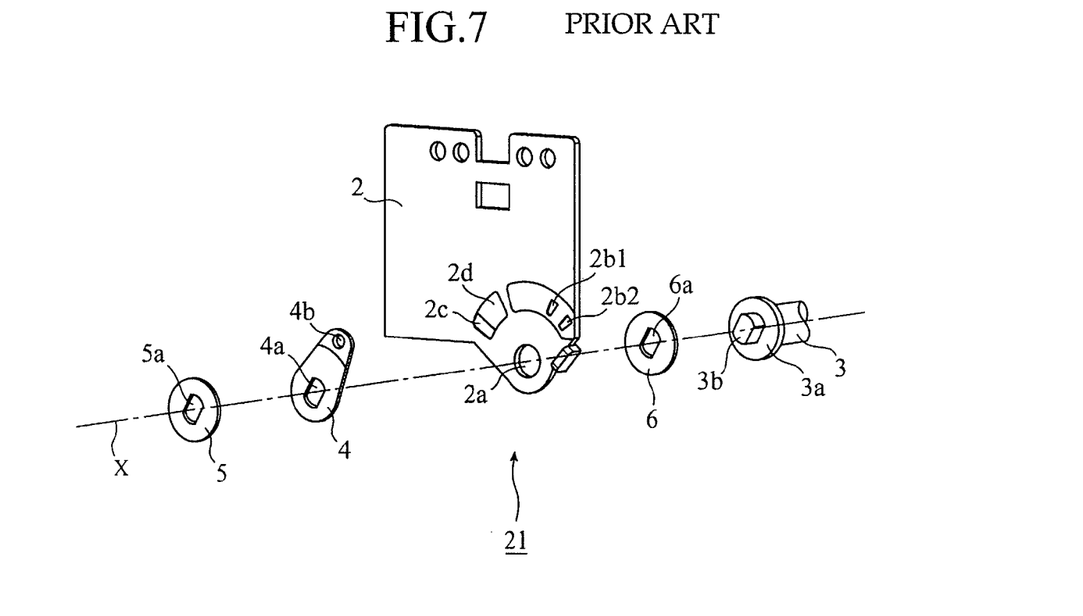
FIG. 7 is an exploded perspective view of the hinge mechanism shown in FIG. 6.

A conventional hinge mechanism used for a vehicle-mounted monitor apparatus will be discussed with reference to FIG. 6 and FIG. 7. FIG. 6 is a perspective view showing an arrangement of a conventional hinge mechanism 21 having a click action, and FIG. 7 is an exploded perspective view thereof. The hinge mechanism 21 is arranged such that a rotation shaft 3 connected to a monitor 13 and rotating about a rotating central axis X is fit in a resilient member 6, a base 2, a leaf spring 4, and a plate 5 to be caulked.

The rotation shaft 3 is provided with a flange 3a having a radius larger than that of a rotation shaft hole 2a of the base 2, and a D-cut section 3b having a radius smaller than that of the rotation shaft hole 2a and having a pair of flat faces formed symmetrically. On the other hand, the rotation shaft hole 2a to be rotatably inserted into by the D-cut section 3b of the rotation shaft 3 is formed in the base 2. Further, insertion holes 4a, 5a, and 6a are prepared in the leaf spring 4, the plate 5, and the resilient member 6, respectively, and are fitted in the D-cut section 3b of the rotation shaft 3. The insertion holes 4a, 5a, and 6a each have an area larger than the sectional area of the D-cut section 3b by the dimension of a fit.

Further, a plurality of click recesses 2b1, 2b2 is concavely provided in the base 2 at a predetermined interval on a circumference centering the rotating central axis X, and also a housing position determining recess 2c is concavely provided in an angular position where the monitor 13 is housed in a monitor main body. A tapered face 2d is formed by gradually reducing the depth of the housing position determining recess 2c from the housing position determining recess 2c toward the click recess 2b1. On the other hand, a click projection 4b that fits in the click recesses 2b1, 2b2 and the housing position determining recess 2c of the base 2 to thus produce a click action is provided in the leaf spring 4.

Figure 8A:
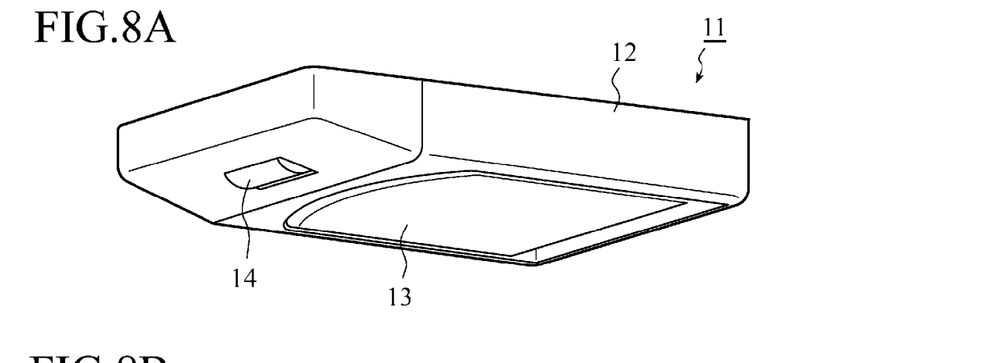
FIG. 8A shows an operation of a monitor using the hinge mechanism, and is a perspective view showing a state where the monitor is closed.
Figure 8B:
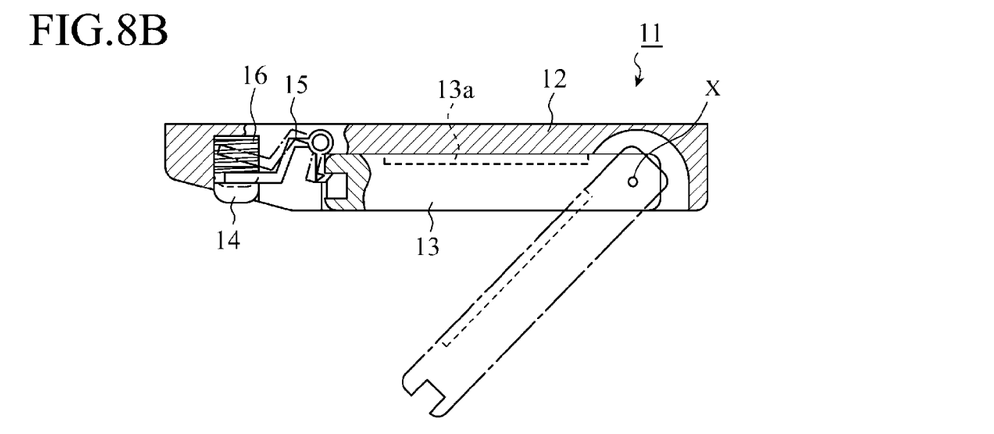
FIG. 8B is a schematic sectional view of the state shown in FIG. 8A.
Figure 8C:
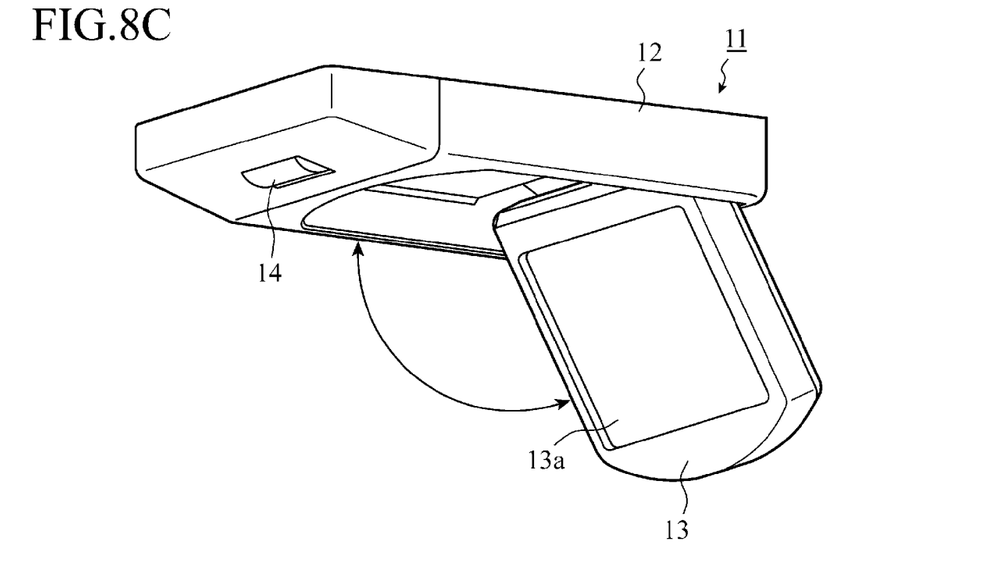
FIG. 8C shows an operation of the monitor using the hinge mechanism, and is a perspective view showing a state where the monitor is opened to a viewing position.

FIG. 8A to FIG. 8C are views showing the opening and closing operation of a ceiling-mounted monitor apparatus 11 including the hinge mechanism 21 as shown in FIG. 6 and FIG. 7. FIG. 8A is a perspective view showing a state where the monitor 13 is housed in a monitor housing case 12, and FIG. 8B is a schematic sectional view thereof. FIG. 8C is a perspective view showing a state where the monitor 13 is opened. The ceiling-mounted monitor apparatus 11 consists of the monitor housing case 12 located on the side of the main body mounted on a ceiling of a vehicle, and the monitor 13 that can be folded and unfolded by the opening and closing with respect to the monitor housing case 12. A monitor screen 13a is provided on one face of the monitor 13. Further, the monitor 13 is locked by a lock 15 associated with a button 14 to be held within the monitor housing case 12. At that time, the hinge mechanism 21 is placed in a condition such that the click projection 4b of the leaf spring 4 is fitted in the housing position determining recess 2c of the base 2. The rotation shaft 3 is rotated integrally with the leaf spring 4, the plate 5, and the resilient member 6 about the rotating central axis X with respect to the base 2 installed on the side of the main body of the monitor apparatus, and thereby the monitor 13 connected to the rotation shaft 3 is also rotated (folded and unfolded) about the rotating central axis X.

As the button 14 provided on the monitor housing case 12 is pushed, the lock 15 holding the monitor 13 is released as shown by a dash-single-dot line in FIG. 8B, and the monitor 13 is rotated by self-weight to an angle of a self-weight fallen position (to a position of the monitor 13 depicted by the dash-single-dot line in FIG. 8B) about the rotating central axis X. At that time, in the hinge mechanism 21, the click projection 4b of the leaf spring 4 slips out from the housing position determining recess 2c of the base 2, and slides on the tapered face 2d due to the self-weight of the monitor 13. Thereafter, a user moves manually the monitor 13 to the viewing position shown in FIG. 8C to enjoy the image. At that time, in the hinge mechanism 21, the click projection 4b fits in the click recess 2b1 or the click recess 2b2 to thereby hold the monitor 13 at the angle of the viewing position.

Moreover, a rotary mounting mechanism disclosed in Patent Document 1 is also arranged to have a click action as in the hinge mechanism 21 discussed above, and includes a base member provided with an insertion hole; a rotation shaft which is inserted into the insertion hole of the base member and rotatably attached thereto about the axis thereof; a click plate having a recess for a click function provided in the face thereof opposing one face of the base member; and a click spring, which has resiliency in the direction parallel to the axis of the rotation shaft, has formed therein a protrusion for a click function, which fits in the recess of the click plate, is non-rotatably fixed to the base member, and also is resiliently attached between the base member and the click plate such that the base member, the rotation shaft, and the click plate are pressed into contact with each other in the direction parallel to the axis of the rotation shaft. Therefore, when the rotation shaft is rotated with respect to the base member, the protrusion for a click function fits in and slips from the recess, to thereby produce a click action.

Furthermore, a hinge mechanism disclosed in Patent Document 2 is arranged as follows: a plurality of friction members are pressed into contact with a rotation member by a resilient member; when the rotation member is rotated, friction is caused between the rotation member and the friction members; thus, the rotation member can be rotated only when rotation torque larger than a predetermined rotation one is applied thereon. In the case of the arrangement, the following torque (hereinafter, referred to as "holding torque") is provided: at any angle of the rotating body connected to the rotation member, the rotating body cannot be rotated unless applied thereon with any of the same predetermined torque or larger, and therefore the rotating body can be held at any angular position.

PRIOR ART DOCUMENTS

Patent Documents
  Patent Document 1: JP-A-2000-55031
  Patent Document 2: JP-A-2001-12451

SUMMARY OF THE INVENTION

Figure 9:
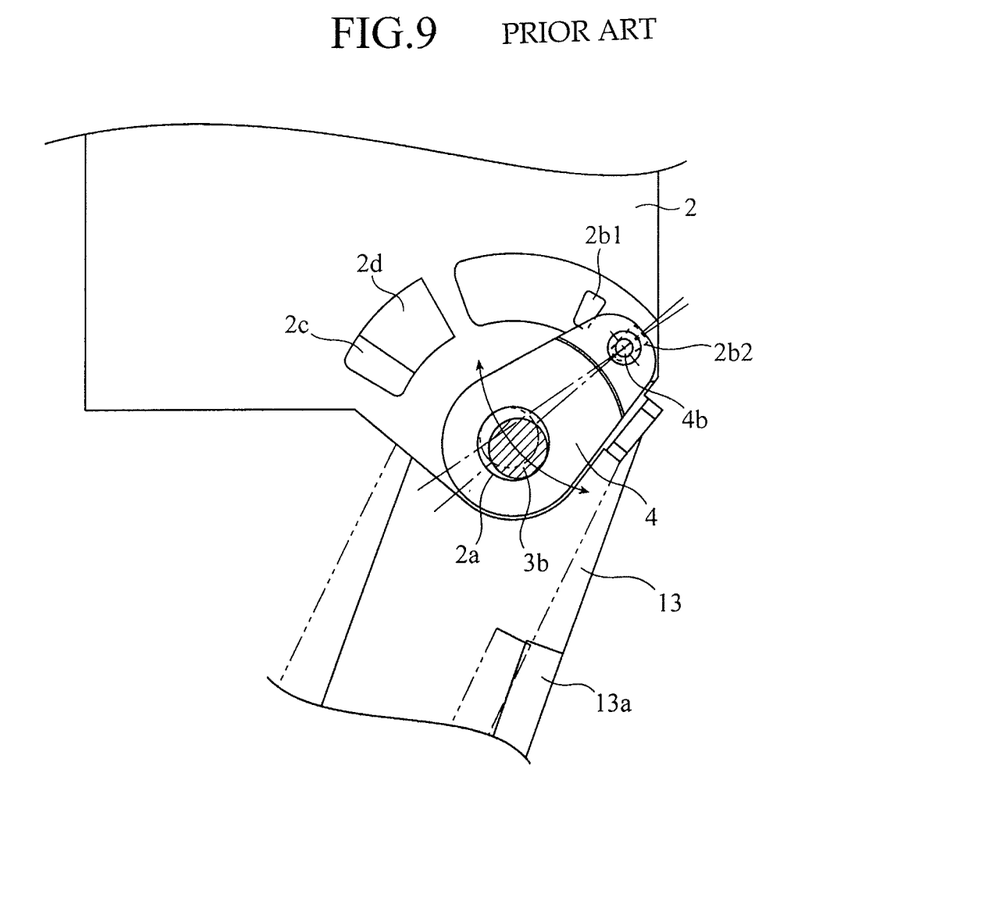
FIG. 9 is a front view showing the arrangement of the hinge mechanism shown in FIG. 6 and FIG. 7.

A hinge mechanism provided with one click projection and eliminating a resilient member 6 as shown in FIG. 6 and FIG. 7 has a problem that a clearance in the fit between a rotation shaft hole of a base and a rotation shaft causes the rotation shaft to be swung. To explain the problem in detail, FIG. 9 shows the front view of the hinge mechanism 21 shown in FIG. 6 and FIG. 7. Note that in FIG. 9, for the purpose of a simple explanation, a plate 5 is omitted in the figure, and also a D-cut section 3b is shown in a columnar shape. In a state where a click projection 4b is fitted in a click recess 2b2 to hold a monitor 13 in an angle of the viewing position, since there exists the clearance in the fit between the rotation shaft hole 2a of the base 2 and the rotation shaft 3, the rotation shaft 3 may be swung by the clearance in the fit of the rotation shaft hole 2a, with the click projection 4b of the leaf spring 4 as a fulcrum. As a result, the monitor 13 may be also swung.

Therefore, in the conventional hinge mechanism 21, it is necessary to provide the resilient member 6 for producing holding torque using the frictional force generated by the urging force thereof between the flange 3a of the rotation shaft 3 and the base 2. However, in the assembly of the hinge mechanism 21, it is required that the plate 5 and the leaf spring 4 be attached around the D-cut section 3b of the rotation shaft 3, and caulking be made while the resilient member 6 is being flexed. Thus, the assembling ability of the hinge mechanism 21 may be also deteriorated.

Further, in the rotary mounting mechanism disclosed in Patent Document 1, the stiffness of the click action is determined by the resilient force of the click spring (resilient member). However, in a state where the protrusion for click function is fitted in the recess, the resilient force of the click spring is released; thus, the click spring goes to a state where the resilient force thereof is the weakest. Therefore, in a predetermined-position holding state where the protrusion and the recess are placed in a fitting relation to thereby work the click function, when the hinge mechanism is subjected to an external force having a small amplitude such as vibration, the protrusion can be moved within the range of flexure of the click spring. Consequently, there is a problem such that when the conventional hinge mechanism is used in the folding and unfolding mechanism of a vehicle-mounted monitor or the like, the protrusion is moved to swing the screen, which makes it hard to view.

Moreover, when the hinge device disclosed in Patent Document 2 is used in the folding and unfolding mechanism of a ceiling-mounted monitor apparatus 11 as shown in FIG. 8, the hinge device is arranged to have the same holding torque applied thereto at any angle; thus, when the monitor is held at an angle of viewing position and an attempt is made to obtain a high holding torque to prevent the monitor from being swung by vibration, sometimes the monitor cannot be fallen by self-weight upon unlocking of the monitor in the position where the monitor is housed. Further, in addition to the fact that the hinge device has to be bulky in the axial direction thereof due to a large number of components of the device, in the event that the plate thickness of the friction member (spring washer or the like) or the spring characteristic of a spring material varies, the hinge device is different in the characteristics of the holding torque; thus, there are some cases that stable torque performance thereof is not obtained. Furthermore, similarly to the hinge mechanism 21 discussed above, it is necessary to secure a suppression member to the end face of the shaft member by caulking while the resilient member for pressing the friction member into contact with the rotation member is being flexed, thus deteriorating the ability of the hinge mechanism to be assembled.

The present invention has been made to solve the above-mentioned problems, and an object of the invention is to prevent a rotating member from being swung upon vibrations without using a friction member and a resilient member.

The hinge mechanism according to the invention includes: a shaft that is connected with a rotating body and provides a axis of rotation; a base that pivotally supports the shaft to be rotatable, and also has one of a click projection and a click recess that is provided therein on a circumference centering the axis of rotation; a plate attached at an end portion of the shaft and rotated integrally; and a leaf spring that is located between the base and the plate, is fit in by the shaft to be rotated integrally, and has the other of the click projection and the click recess that engages with the one of the click projection and the click recess provided in the base to hold the rotating body in a predetermined rotation angle position, wherein the leaf spring has a sliding friction projection that slides with pressed into contact with the base on the side opposite from the other of the click projection and the click recess across the axis of rotation.

According to the present invention, the shaft can be prevented from being swung under vibrating conditions by virtue of the leaf spring having the sliding friction projection that slides with pressed into contact with the base on the side opposite from the other of the click projection and the click recess across the axis of rotation.

BRIEF DESCRIPTION OF THE DRAWINGS

FIG. 3(a) shows a state where a monitor is held in a housing position, FIG. 3(b) shows a state where the monitor 13 is held in a position where the monitor has fallen under its own weight, and FIG. 3(c) shows a state where the monitor 13 is held in a viewing position.

FIG. 4(a) is a sectional view thereof taken along the line A-A in FIG. 3(a), FIG. 4(b) is a sectional view thereof taken along the line B-B in FIG. 3(b), and FIG. 4(c) is a sectional view thereof taken along the line C-C in FIG. 3(c).

FIG. 5(a) shows a cutaway formed with half-blanking process, and FIG. 5(b) shows a cutaway formed with drawing process.

BEST MODE FOR CARRYING OUT THE INVENTION

Embodiments of the present invention will now be described with reference to the accompanying drawings in order to explain the present invention in more detail.

First Embodiment

Figure 1:
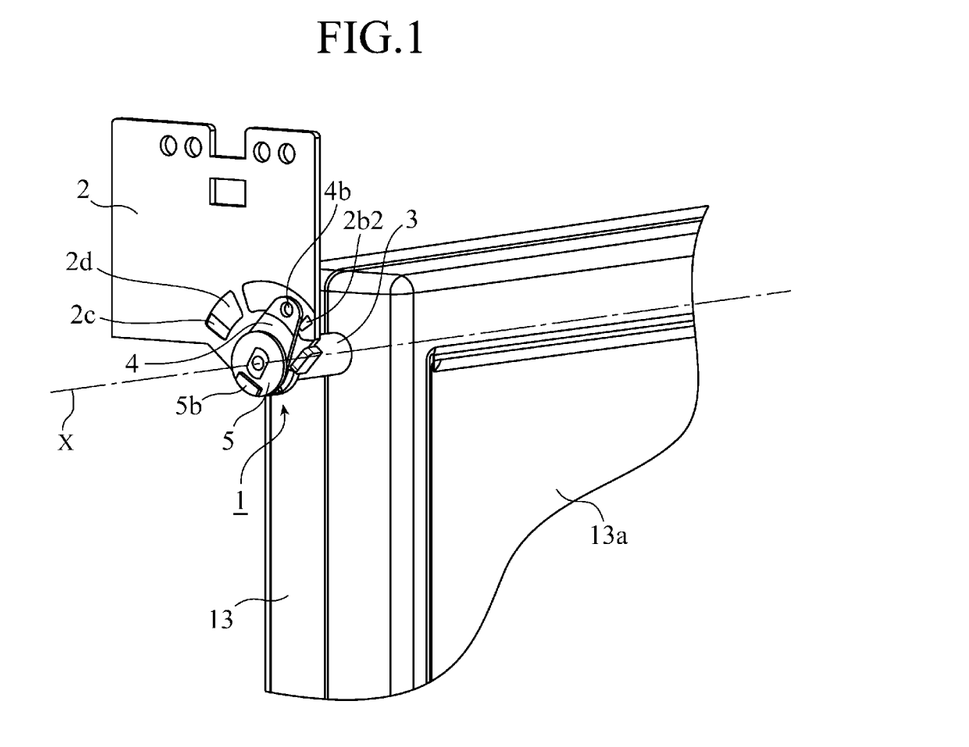
FIG. 1 is a perspective view showing an arrangement of a hinge mechanism according to a first embodiment of the present invention.
Figure 2:
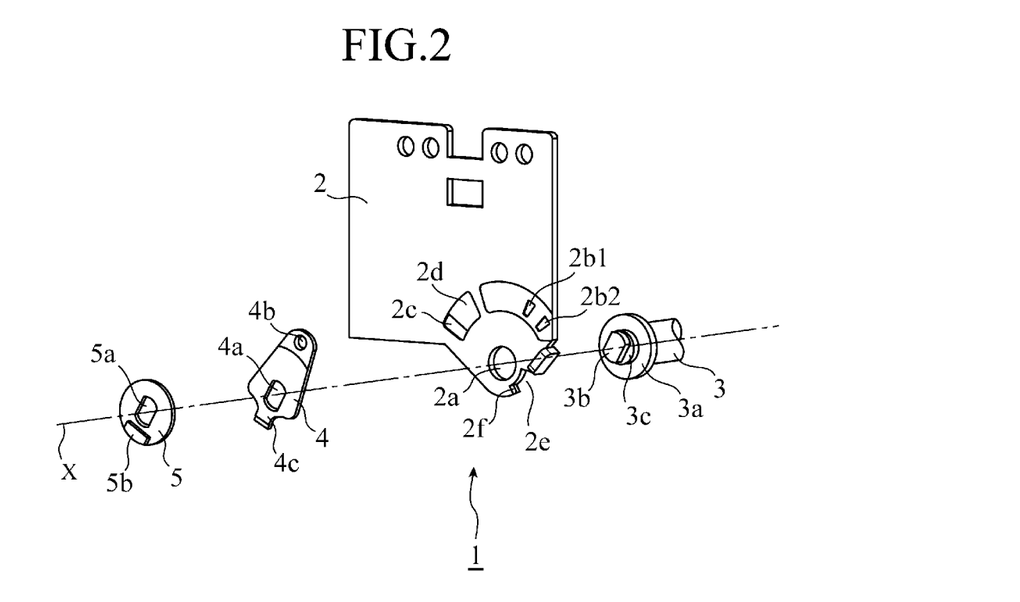
FIG. 2 is an exploded perspective view of the hinge mechanism shown in FIG. 1.

In a first embodiment of the present invention, a hinge mechanism will be explained using a case where the mechanism is used in a ceiling-mounted monitor apparatus 11 as shown in FIG. 8A to FIG. 8B by way of example. FIG. 1 is a perspective view showing an arrangement of a hinge mechanism 1 according to the first embodiment of the present invention, and FIG. 2 is an exploded perspective view thereof. Note that in the following embodiments, parts which are the same as or equivalent to the constituent elements in the prior art (FIG. 6 to FIG. 9) previously discussed are designated by similar numerals, and explanations of the parts will be omitted.

A base 2 is newly provided with a cutaway 2e formed by cutting away a portion of an edge thereof opposing a housing position determining recess 2c across a rotating central axis X, and a taper 2f is provided at a portion of the edge of the cutaway 2e.

A rotation shaft 3 is newly provided with a cylindrical section 3c having a shaft radius smaller than the hole radius of a rotation shaft hole 2a by the dimension of a fit and having a length somewhat larger than the board thickness of the base 2. A D-cut section 3b is provided on the cylindrical section 3c. Note that the D-cut section 3b has a shaft radius smaller than that of the cylindrical section 3c, and further has flat faces formed in opposite directions.

A leaf spring 4 is newly provided with a click projection 4b and a sliding friction projection 4c at the edge thereof opposing the click projection 4b across the rotating central axis X. As shown in FIG. 3(a) and FIG. 4(a), when the click projection 4b is fitted in the housing position determining recess 2c of the base 2, since the sliding friction projection 4c is located in the area of the cutaway 2e to produce holding torque, not producing holding torque. On the other hand, as the rotation shaft 3 is rotated, the sliding friction projection slides while pressing the surface of the base 2 to thereby produce the holding torque, as shown in FIG. 3(c) and FIG. 4(c).

A plate 5 is newly provided with a drawn recess 5b by a drawing process in the position corresponding to the sliding friction projection 4c of the leaf spring 4. The plate 5 receives a stress upon flexing of the leaf spring 4 on the whole face thereof to thereby prevent caulking from being loosened because of the concentration of the stress around a passing hole 4a. In addition, the plate 5 is provided with the drawn recess 5b for avoiding the abutment of the sliding friction projection 4c of the leaf spring 4 against the plate 5 when the projection 4c of the leaf spring 4 is flexed.

In the assembly of the hinge mechanism 1, the cylindrical section 3c of the rotation shaft 3 is fitted in the rotation shaft hole 2a of the base 2; subsequently, the D-cut section 3b of the rotation shaft 3 is fitted in the passing hole 4a of the leaf spring 4 and the passing hole 5a of the plate 5 with the flat faces thereof conformed, and the end face of the D-cut section 3b and the plate 5 is caulked. At that time, when an alignment is carried out such that the sliding friction projection 4c of the leaf spring 4 is overlapped at the position of the cutaway 2e of the base 2, the assembly becomes possible without flexing the sliding friction projection 4c, thereby enhancing assembling ability thereof.

Figure 3:
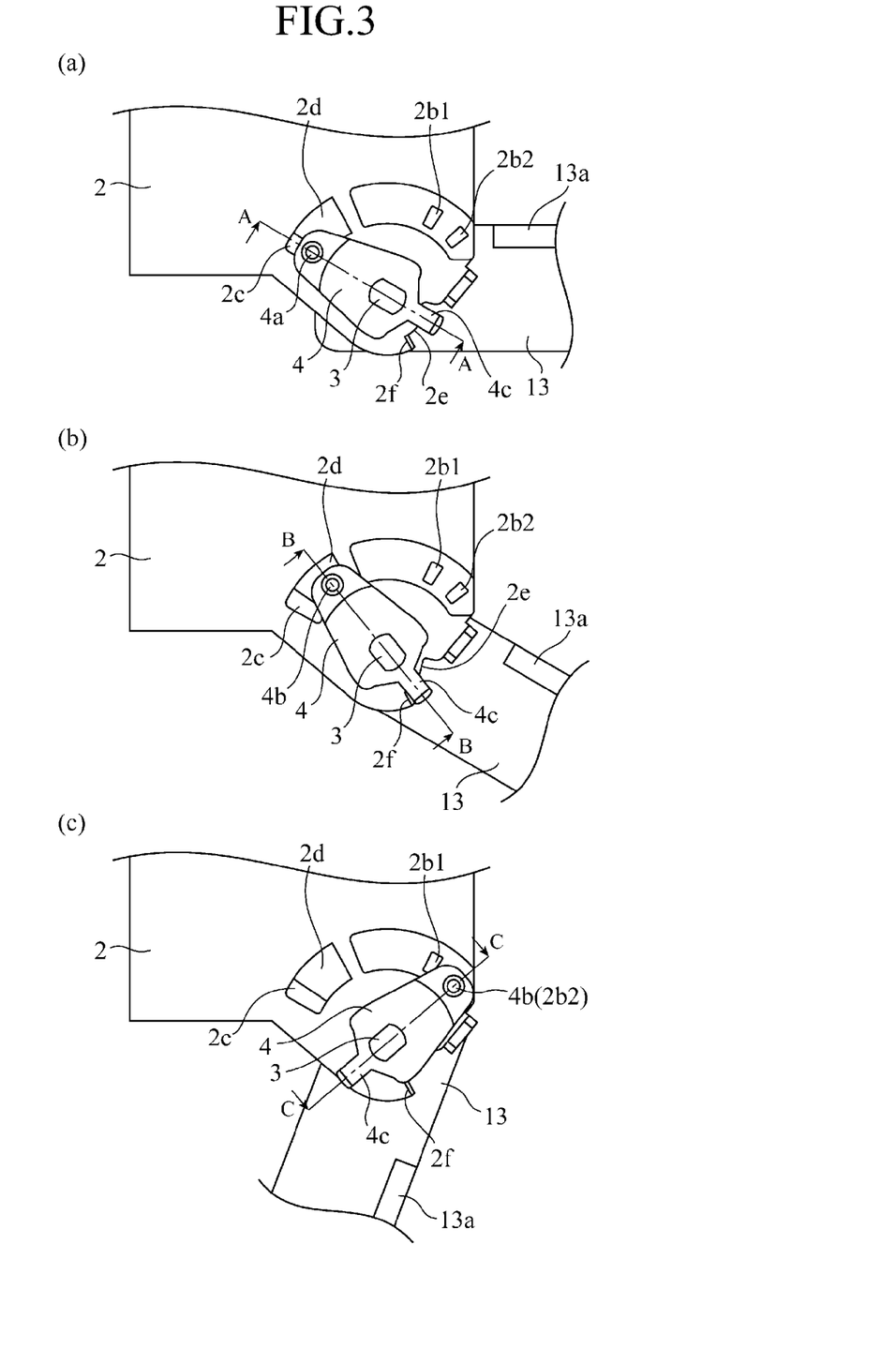
FIG. 3 shows a positional relationship between a base and a leaf spring of the hinge mechanism according to the first embodiment.
Figure 4:
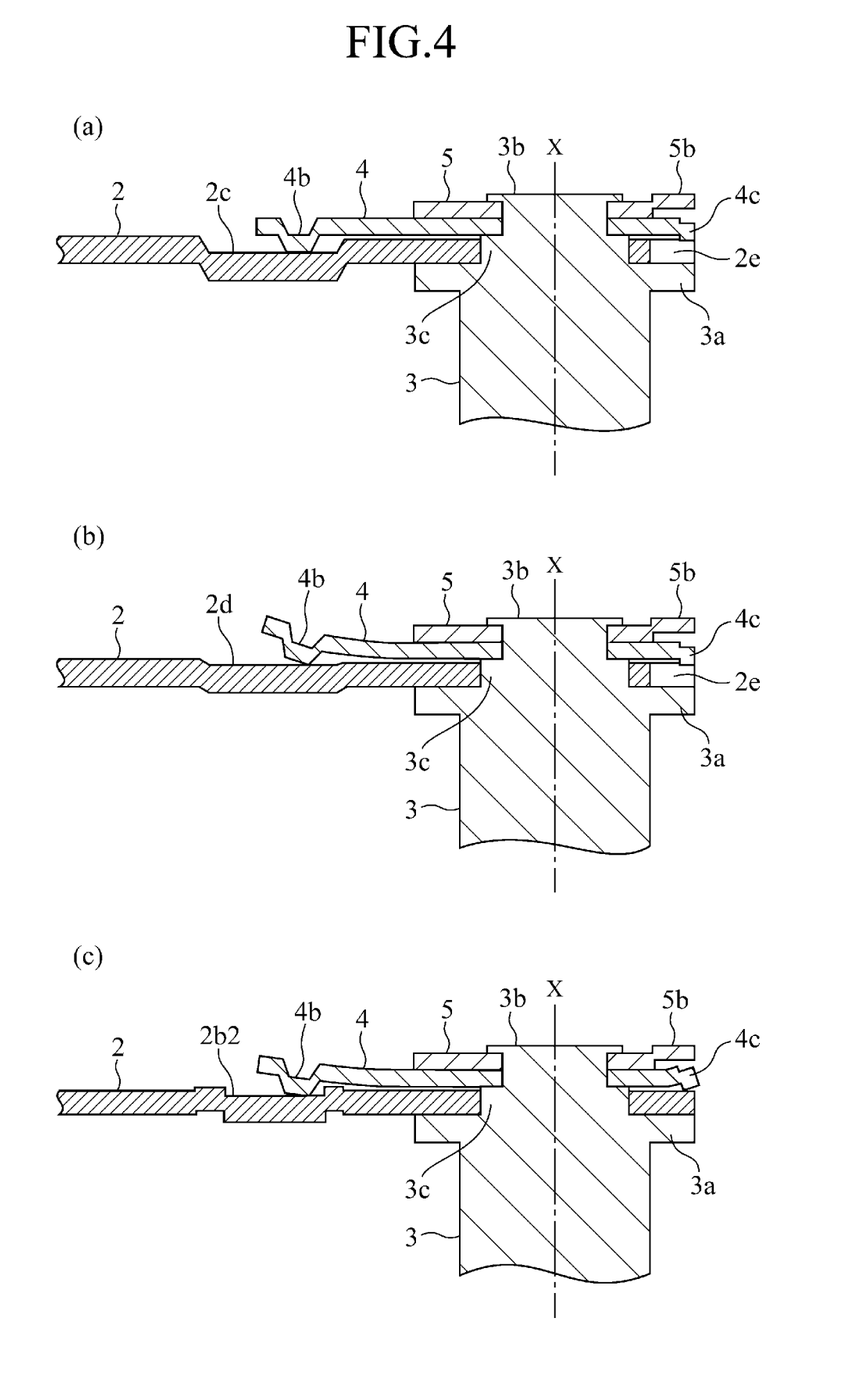
FIG. 4 shows a positional relationship between a base and a leaf spring of the hinge mechanism according to the first embodiment.

FIG. 3 and FIG. 4 show the positional relationship between the base 2 and the leaf spring 4; FIG. 3(a) shows a state where a monitor (rotating body) 13 is held in a housing position, FIG. 3(b) shows a state where the monitor 13 is held in a self-weight fallen position thereof, FIG. 3(c) shows a state where the monitor 13 is held in a viewing position thereof, FIG. 4(a) is a sectional view thereof taken along the line A-A in FIG. 3(a), FIG. 4 (b) is a sectional view thereof taken along the line B-B in FIG. 3(b), and FIG. 4(c) is a sectional view thereof taken along the line C-C in FIG. 3(c). Note that in FIGS. 3 and 4, the plate 5 and monitor 13 are omitted, respectively.

As shown in FIG. 3(a) and FIG. 4(a), when the click projection 4b of the leaf spring 4 is fitted in the housing position determining recess 2c of the base 2, no holding torque is produced on the side of the click projection 4b, and further no holding torque is produced in the sliding friction projection 4c on the side opposite therefrom, because of the coming of the projection into the cutaway 2e. In the above state of the hinge mechanism 1, the ceiling-mounted monitor apparatus 11 is placed in the one shown by solid lines in FIG. 8A and FIG. 8B, and the monitor 13 is kept in a housing position of the monitor housing case 12 by a lock 15. When a button 14 is pushed by a user to release the lock 15, no retaining torque is produced in the hinge mechanism 11; thus, the rotation shaft 3 is rotated by the self-weight of the monitor 13 to cause the click projection 4b to move within the housing position determining recess 2c and cause the sliding friction projection 4c to move within the area of the cutaway 2e. Afterwards, the click projection 4b slides on a tapered face 2d, and the rotational speed of the monitor 13 begins to be reduced due to the holding torque produced by friction.

As shown in FIG. 3(b) and FIG. 4(b), when the sliding friction projection 4c moves to the taper 2f formed at the edge of the cutaway 2e, the sliding friction projection 4c abuts against the taper 2f to produce the holding torque; thus, the self-weight falling of the monitor 13 is stopped by the holding torque produced by the click projection 4b and also the holding torque produced by the sliding friction projection 4c. For this reason, the monitor 13 is held in the self-weight fallen position due to the holding torque of the hinge mechanism 1. At that time, since the edge of the cutaway 2e is formed with the taper 2f, it is possible to restrict the bounce of the monitor 13 which occurs as a result of a rapid collision of the sliding friction projection 4c with the edge of the cutaway 2e due to the self-weight falling of the monitor 13, and further smoothly stop the rotation of the leaf spring 4. Note that the self-weight fallen position of the monitor 13 is a position of a state shown by a dash-single-dot line in FIG. 8B. The circumferential width of the cutaway 2e according to the self-weight fallen position can be determined, and the holding torque by the sliding friction projection 4c can be produced only within the range of an arbitrary angle of the opening and closing angles of the monitor 13.

When the monitor 13 staying in the self-weight fallen position is pushed by a user, the click projection 4b slides on the surface of the base 2 from the tapered face 2d toward the click recess 2b1, and the sliding friction projection 4c slides while riding on the taper 2f.

When the click projection 4b slides on the surface of the base 2 from the position shown in FIG. 3(b) toward the click recess 2b2, the sliding friction projection 4c on the side opposite therefrom also slides on the surface of the base 2 while flexing in a condition fit into the drawn recess 5b formed in the plate 5, as shown in FIG. 4(c); thus, holding torque is produced at each end of the leaf spring 4. In such a way, holding torque is produced at each end of the leaf spring 4; thus, in the hinge mechanism 1, the holding torque can be obtained without the need of a plurality of friction members (spring washer or the like) equipped in the conventional hinge mechanism, thereby reducing the number of components.

Further, since the hinge mechanism 1 is not arranged to employ a friction member therein, there can be provided a hinge mechanism to be not affected by variations in the plate thickness and the friction of the friction members and to give the stable holding torque.

As shown in FIG. 3(c) and FIG. 4(c), by virtue of the click projection 4b that fits in the click recess 2b2, the monitor 13 is held in the corresponding angular position. Note that an angular position in the state where the click projection 4b is fitted in the click recess 2b1 or 2b2 is a viewing position of a monitor screen 13a, and the viewing position is the one of the state shown in FIG. 8C.

At that time, in addition to the fitting of the click projection 4b, holding torque is produced in the sliding friction projection 4c of the leaf spring 4; thus, the rotation shaft 3 is prevented from being swung with the click projection 4b as a fulcrum by the clearance of the fit in the rotation shaft hole 2a, thereby suppressing efficiently the clearance of the fit. Therefore, the force for thrusting the sliding friction projection 4c against the base 2 can be minimized.

Moreover, since the leaf spring 4 is provided with the click projection 4b for click action and further the sliding friction projection 4c for sliding friction, relative variations between the force for the click action and the force of the folding and unfolding operations are also small.

As discussed above, according to the first embodiment, the hinge mechanism 1 is arranged by including: the rotation shaft 3 which is connected to the monitor 13 and serves as the rotating central axis X; the base 2 that pivotally supports the shaft 3 to be rotatable and also has the click recesses 2b1, 2b2 and the housing position determining recess 2c on the circumference centering the rotating central axis X; the plate 5 that is attached at the end portion of the rotation shaft 3 to be rotated integrally; and the leaf spring 4 that is located between the base 2 and the plate 5, is fit in by the rotation shaft 3 to be rotated integrally, and has the click projection 4b that fits in the click recesses 2b1, 2b2 and the housing position determining recess 2c provided in the base 2 to hold the monitor 13 in a predetermined rotation angle position, wherein the leaf spring 4 is further provided with the sliding friction projection 4c which slides with pressed into contact with the base 2 on the side opposite from the click projection 4b across the rotating central axis X. Therefore, the rotation shaft 3 can be prevented from being swung on vibrations. Further, since the clearance of the fit in the rotation shaft 3 can be efficiently prevented, the force for thrusting the sliding friction projection 4c against the base 2 can be minimized.

Moreover, in the case where the sliding friction projection 4c is provided therein, holding torque can be obtained without the need of a friction member and a resilient member as in the conventional hinge mechanism; thus, not only a hinge arrangement can be achieved by a small number of components, but also a hinge mechanism 1 to be not affected by variations in the plate thickness and the friction characteristics of the friction member, and to give stable holding torque can be provided.

Furthermore, since the leaf spring 4 is provided with the click projection 4b and the sliding friction projection 4c, relative variations in the force for the click action and the force for the opening and closing operations are also small.

Furthermore, according to the first embodiment, the base 2 is arranged to have the cutaway 2e provided on a portion of the face thereof where the sliding friction projection 4c of the leaf spring 4 slides. Therefore, in the assembly of the hinge mechanism 1, when the leaf spring 4 and the base 2 are disposed in an overlapping condition such that the sliding friction projection 4c is fitted in the cutaway 2e, the assembly becomes possible without flexing the leaf spring 4, thereby enhancing assembling ability thereof.

Further, with the adjustment of the size of the cutaway 2e, it is arranged that the cutaway 2e on which no sliding friction projection 4c of the leaf spring 4 works is provided within the range of the base 2 where the monitor 13 located in the housing position is rotated to the self-weight fallen position by self-weight. Therefore, in the opening and closing of the monitor 13, when the sliding friction projection 4c of the leaf spring 4 is engaged with the cutaway 2e of the base 2 within a predetermined angular range (that is, from the housing position to the self-weight fallen position) to thereby restrain the sliding on the surface of the base 2, it is possible to produce holding torque only in the angular range required for the opening and closing operations.

Furthermore, according to the first embodiment, the cutaway 2e of the base 2 is arranged to have the taper 2f provided at the edge thereof abutting against the sliding friction projection 4c of the leaf spring 4. Therefore, it is possible to restrict a rapid collision of the sliding friction projection 4c with the edge of the cutaway 2e, and further it is also possible to smoothly produce the holding torque therein.

Figure 5:
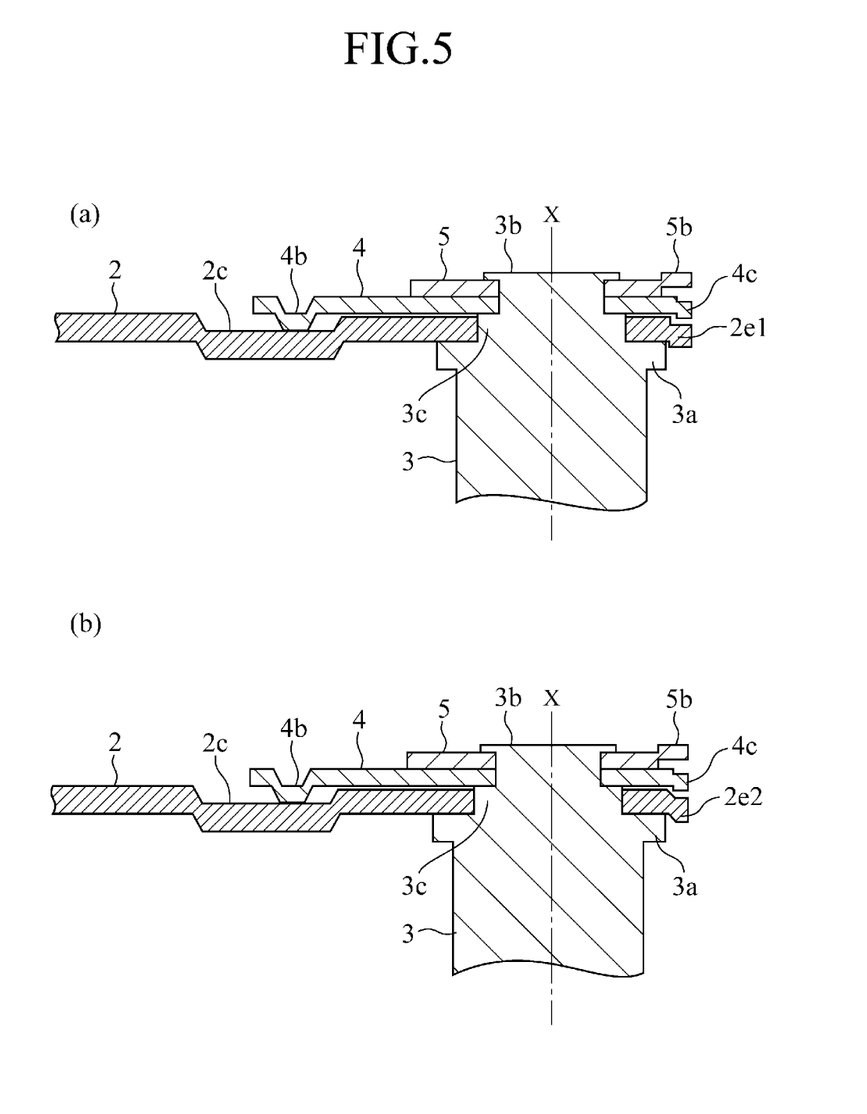
FIG. 5 is a sectional view of a hinge mechanism having another arrangement according to the first embodiment taken along the line corresponding to the line A-A in FIG. 3(a)

Incidentally, in the first embodiment discussed above, the cutaway 2e is arranged to be formed by cutting away a portion of the edge of the base 2; however, it is not limited thereto. The cutaway 2e may be formed by a half-blanking or drawing process. FIG. 5 is a sectional view of a hinge mechanism 1 having another arrangement according to the first embodiment taken along the line corresponding to the line A-A in FIG. 3(a); FIG. 5(a) shows a cutaway 2e1 formed by the half-blanking, and FIG. 5(b) shows a cutaway 2e2 formed by the drawing. In the arrangement having the cutaway 2e1 or cutaway 2e2 shown in FIG. 5(a) and FIG. 5(b), in addition to an effect similar to that of the cutaway 2e according to the first embodiment, since the base 2 is not completely cut away, and also holding torque can be controlled while the strength of the base 2 is ensured.

Besides, in the illustrated examples, it is arranged that the base 2 is provided with the click recesses 2b1, 2b2 and the housing position determining recess 2c on the circumference of the base 2 about the rotating central axis X, and the leaf spring 4 is provided with the click projection 4b that can fit in the recesses 2b1, 2b2, and 2c. However, opposite to the above, even when the base 2 and the leaf spring are provided with the click projection and the recesses, respectively, the same action and effect can be obtained. In addition, in the above, the plate 5 is secured to the end portion of the rotation shaft 3 by caulking; however, the plate may be secured thereto by a screw, bonding, or the like.

Moreover, in the first embodiment discussed above, it is arranged that the hinge mechanism 1 be used for the ceiling-mounted monitor apparatus 11 using a manual opening and closing system; however, the mechanism is not limited thereto. It may be arranged that the hinge mechanism be used for an electric ceiling-mounted monitor apparatus using a motor. In the case of this arrangement, when the sliding friction projection 4c slides on the surface of the base 2, the holding torque is produced; thus, a clearance caused by the backlash or the like of a decelerating mechanism can be restricted, and the monitor 13 can be prevented from being swung. Furthermore, when the monitor 13 is folded from the self-weight fallen position to the housing position, which requires the largest driving torque in the ceiling-mounted monitor apparatus, the holding torque is not produced by virtue of the sliding friction projection 4c entering the cutaway 2e, the motor has only to output a force corresponding to the weight of the monitor 13.

Industrial Applicability

As discussed above, the hinge mechanism according to the present invention can prevent a rotating body from being swung on vibrations, and thus the hinge mechanism is suitably used for a hinge for folding and unfolding a monitor of a ceiling-mounted monitor apparatus.

The invention claimed is:

1. A hinge mechanism including:
   a shaft that is connected with a rotating body and serves as an axis of rotation;
   a base that pivotally supports the shaft to be rotatable, and also has a click recess on a circumference centering the axis of rotation;
   a plate that is attached at an end portion of the shaft in such manner that the plate and the shaft are rotated integrally with each other; and
   a leaf spring that is located between the base and the plate, and into which is fitted the shaft in such manner that the leaf spring and the shaft are rotated integrally with each other,
   wherein the leaf spring has a click projection that engages with the click recess that is provided in the base to thus hold the rotating body in a predetermined rotation angle position,
   wherein the leaf spring has a sliding friction projection that slides when pressed into contact with the base, the sliding friction projection being on an opposite side of the axis of rotation with respect to the click projection, and
   wherein the plate includes a drawn recess that receives the sliding friction projection as the sliding friction projection is pressed into contact with a surface of the base.

2. The hinge mechanism according to claim 1, wherein the base has a cutaway on which no sliding friction projection of the leaf spring acts within a range such that the rotating body located in a predetermined position is rotated by self-weight.

3. The hinge mechanism according to claim 2, wherein the cutaway of the base has an edge that abuts against the sliding friction projection of the leaf spring and that is formed in a tapered shape.

4. The hinge mechanism according to claim 2, wherein the cutaway of the base is formed by a half-blanking or drawing process.

5. The hinge mechanism according to claim 1, wherein the sliding friction projection is pressed into contact with a surface of the base when the click projection engages with the click recess.

6. A hinge mechanism including:
   a shaft that is connected with a rotating body and serves as an axis of rotation;
   a base that pivotally supports the shaft to be rotatable, and also has a click projection on a circumference centering the axis of rotation;
   a plate that is attached at an end portion of the shaft in such manner that the plate and the shaft are rotated integrally with each other; and
   a leaf spring that is located between the base and the plate, and into which is fitted the shaft in such manner that the leaf spring and the shaft are rotated integrally with each other,
   wherein the leaf spring has a click recess that engages with the click projection that is provided in the base to thus hold the rotating body in a predetermined rotation angle position,
   wherein the leaf spring has a sliding friction projection that slides when pressed into contact with the base, the sliding friction projection being on an opposite side of the axis of rotation with respect to the click recess
   wherein the plate includes a drawn recess that receives the sliding friction projection as the sliding friction projection is pressed into contact with a surface of the base.

7. The hinge mechanism according to claim 6, wherein the base has a cutaway on which no sliding friction projection of the leaf spring acts within a range such that the rotating body located in a predetermined position is rotated by self-weight.

8. The hinge mechanism according to claim 7, wherein the cutaway of the base has an edge that abuts against the sliding friction projection of the leaf spring and that is formed in a tapered shape.

9. The hinge mechanism according to claim 7, wherein the cutaway of the base is formed by a half-blanking or drawing process.

10. The hinge mechanism according to claim 6, wherein the sliding friction projection is pressed into contact with a surface of the base when the click recess engages with the click projection.

* * * * *